United States Patent Office 3,826,794
Patented July 30, 1974

3,826,794
PROTECTED DECAPEPTIDE DERIVATIVES OF GONADOTROPIN RELEASING HORMONE
George Rogelio Flouret, Waukegan, Ill., assignor to Abbott Laboratories, North Chicago, Ill.
No Drawing. Filed Sept. 13, 1971, Ser. No. 180,160
Int. Cl. C07c *103/52;* C07g *7/00*
U.S. Cl. 260—112.5                          6 Claims

ABSTRACT OF THE DISCLOSURE

The synthesis of the protected decapeptide pyro-Glu-His-Trp-Ser-Tyr-Gly-Leu-Arg-Pro-Gly-amide from the corresponding nonapeptide carrying easily removable protective groups is described. The decapeptide, upon removal of its protective groups, is identical with the gonadotropin-releasing hormone.

DETAILED DESCRIPTION OF THE INVENTION

Recent discovery of the aminoacid sequence of the gonadotropin (Gn)-releasing hormone (RH) has made it highly desirable to produce this substance on a practical scale in a purity sufficient to use the substance therapeutically in instances of hormone deficiencies and possibly as a regulating agent for the ovulation cycle in female warm-blooded animals. For instance, small doses of this Gn-RH, administered by intravenous injections to female sheep in the anestrus cycle produces ovulation.

The formula of Gn-RH has been identified with the aminoacid sequence pyro-Glu-His-Trp-Ser-Tyr-Gly-Leu-Arg-Pro-Gly-NH$_2$ but in order to make such a large molecule from simple, single aminoacids, a considerable number of steps including several condensation reactions are required. In order to assure such condensations to take place at the desired sites, other functional groups on the molecule that are not to take part in this reaction must temporarily be protected by groups that can be removed at will.

A relatively simple method has now been devised to produce the desired aminoacid chain in surprisingly good yield. The new method involves a minimum of group-protecting reactions and removal reactions for such protective groups, and as a result employs a number of intermediates not heretofore described in the literature and not available in nature.

For the purpose of the present disclosure, it is to be understood that all aminoacids used are in their optically active L-form except for glycine.

The present invention is particularly concerned with the provision of the intermediate decapeptide pyro-Glu-His-Trp-(O-R)Ser-(O-R′)Tyr - Gly - Leu - (N$^\omega$-R″)Arg-Pro-Gly-NH$_2$ which carries at least the three indicated protective groups R, R′ and R″ that can be removed by simple methods to produce the desired Gn-RH. It is another object of the present invention to provide a process for the preparation of the above protected decapeptide; it is a further object of this invention to provide a method to convert the above protected peptide to the free decapeptide.

These and other objects are accomplished by providing pyro-Glu-His-Trp-(O-R)Ser-(O-R′)Tyr-
    Gly-Leu-(N$^\omega$-R″)Arg-Pro-Gly-NH$_2$   I wherein R, R′ and R″ are protective groups that are removable by hydrogenation or treatment with hydrofluoric acid. However, other similarly removable protective groups may also be included, such as a substituent on the imino-nitrogen of histidine. Ordinarily, R is represented by tetrahydropyranyl, *tert.*-butyl, acetyl, benzyloxycarbonyl or benzyl, R′ is tetrahydropyranyl, *tert.*-butyl, acetyl, benzyloxycarbonyl, benzyl, triphenylmethyl or tosyl and R″ is nitro, tosyl, benzyloxycarbonyl, *p*-nitrobenzyloxycarbonyl or tetrachloroisopropyloxyphthaloyl substituting one of the hydrogen atoms in the amino groups of the guanidine moiety in Arg. Optionally, the imino-nitrogen in the histidyl moiety may carry benzyl, tosyl, 2,4-dinitrophenyl or other protective groups well recognized in the peptide art.

The protected decapeptide of Formula I is prepared by reacting the protected nonapeptide His-Trp-(O-R)Ser-(O-R′)Tyr-Gly-Leu-(N$^\omega$-R″)Arg-Pro-Gly-NH$_2$ with an active ester or a mixed anhydride of pyroglutamic acid or other known derivatives of the latter in the presence of an inert solvent. The term "active ester" is used here to express that the carboxylic acid group of the pyroglutamic acid is esterified with a group that is easily replaced when reacting said ester with an amine and which, upon being replaced, converts into the desired amide and an inert by-product. A suitable "active ester" for the above reactions is the pentachlorophenyl ester; however, equally useful are the *p*-nitrophenyl, the 2,4,5-trichlorophenyl, the 2,4-dinitrophenyl, the N-hydroxysuccinimide, the 2′, 3- or 4-fluorophenyl esters or similarly well known esters of pyroglutamic acid.

The protected decapeptide of Formula I can be converted to the free decapeptide (or Gn-RH) by treating it with hydrofluoric acid. During this reaction, the protective groups R, R′ and R″ all are replaced by hydrogen. Alternatively, the protective groups can be removed by hydrogenation using a palladium catalyst.

In a more specific embodiment, the above-named protected nonapeptide wherein R and R′ are benzyl and R″ is NO$_2$ is dissolved in dimethylformamide at a high concentration, preferably at a molarity of between 0.1 to 1.0 and an excess of 50–200% over the equimolar amount of pyroglutamic acid pentachlorophenyl ester is added at a temperature between 0 and 30° C. After several hours, the reaction solution is worked up through chromatography, using chloroform containing increasing amounts of methanol for elution. The desired fractions of the eluate are combined and crystallized to produce the pure decapeptide containing the three protective groups identified above or equivalent protective groups.

In order to prepare Gn-RH, the above material is placed in a HF-resistant reaction vessel and anisole is added to take up the NO$_2$⁺ and benzylcarbonium ions resulting from the ensuing reaction. The mixture is then treated at a temperature between 0° and 30° C. with excess hydrogen fluoride. The excess hydrogen fluoride that may be present is removed after about one hour, and the product is dried and purified. The Gn-Rh prepared in this manner is highly active in biological tests showing lutenizing-hormone and follicle-stimulating-hormone releasing activity in warm-blooded animals.

In order to make the nonapeptide used as the starting material for the present invention, the following reaction sequence is followed: N-benzyloxycarbonyl-proline *p*-nitrophenyl ester is reacted with glycinamide, preferably with an excess of the latter over the equimolar amount and the obtained N-benzyloxycarbonyl-prolylglycinamide is converted to the unprotected dipeptide by hydrogenation or acid treatment. The prolylglycinamide is then reacted with N$^\alpha$-benzyloxycarbonyl-N$^\omega$-nitro-arginine to form a twice-protected tripeptide from which the benzyloxycarbonyl group is removed by acid treatment to furnish N$^\alpha$-nitro-arginyl-prolylglycinamide, hereinafter referred to as (N$^\omega$-NO$_2$)Arg-Pro-Gly-NH$_2$. The latter is reacted with N-*tert.*-butyloxycarbonyl-leucine *p*-nitrophenyl ester to produce a twice-protected tetrapeptide from which the *tert.*-butyloxycarbonyl group is removed by treatment with an acid to yield Leu-(N$^\omega$-NO$_2$)Arg-Pro-Gly-NH$_2$. This NO$_2$-protected tetrapeptide is reacted with N-*tert.*-butyloxycarbonylglycine *p*-nitrophenyl ester to a twice-protected pentapeptide from which the butyloxycarbonyl group is removed as in the case of the tetrapeptide to produce Gly-Leu-($N^\omega$-$NO_2$)Arg-Pro-Gly-$NH_2$. In turn, this pentapeptide is reacted with N-tert.-butyloxycarbonyl-O-benzyl-tyrosine p-nitrophenyl ester to produce a hexapeptide with three protective groups. The tert.-butyloxycarbonyl group is removed by treatment of this material with trifluoroacetic acid/methylene chloride 1:1 to give the twice-protected hexapeptide (O-Bzl)Tyr-Gly-Leu-($N^\omega$-$NO_2$)Arg-Pro-Gly-$NH_2$.

The above twice-protected hexapeptide is reacted with N-tert.-butyloxycarbonyl-O-benzyl-serine p - nitrophenyl ester to produce a heptapeptide carrying four protective groups. The tert.-butyloxycarbonyl group is removed as in the case of the hexapeptide to yield the tri-protected heptapeptide (O-Bzl)-Ser-(O-Bzl)Tyr-Gly-Leu-($N^\omega$-$NO_2$)Arg-Pro-Gly-$NH_2$. The latter is reacted with N-tert.-butyloxycarbonyl-tryptophane p-nitrophenyl ester. Subsequent removal of the tert.-butyloxycarbonyl group with trifluoroacetic acid/methylene chloride 1:1 containing a small amount of mercaptoethanol produces the tri-protected octapeptide Trp-(O-Bzl)Ser-(O-Bzl)Tyr-Gly-Leu-($N^\omega$-$NO_2$)Arg-Pro-Gly-$NH_2$. Finally, this material is reacted with N.-tert.-butyloxycarbonylhistidine (optionally containing an additional protective group on the imidazole-N and hereinafter identified as ($N^{Im}$-X)His) and an activating agent to produce the corresponding nonapeptide from which the tert.-butyloxycarbonyl group is removed as in the previous step. The nonapeptide carrying three (or four) protective groups has the following aminoacid sequence: ($N^{Im}$-X)His-Trp-(O-Bzl)Ser-(O-Bzl)Tyr-Gly-Leu-($N^\omega$-$NO_2$)Arg-Pro-Gly-$NH_2$.

This protected peptide intermediate was identified by elemental analyses and NMR spectrum to have the assigned structure and behaved as a single compound as shown by thin layer chromatography.

All of the above condensation reactions are carried out in the presence of an inert solvent such as dimethylacetamide or dimethylformamide or other organic liquids that do not react with either of the starting materials or the products present in each step. Of course, it is to be understood, that the above reaction sequence may be followed without using the specificially named protective groups in each of the described stages. For instance, the benzyl groups used to protect the free hydroxyl groups in serine or tyrosine may be replaced by tetrahydropyranyl, tert.-butyl, acetyl, benzyloxycarbonyl, p-methoxy-, p-nitro- or p-halo-benzyloxycarbonyl and in the case of tyrosine, also with triphenylmethyl or tosyl; the nitro group protecting the amino group in the guanidine moiety of arginine may be replaced by converting the amino group to an amido group with a sulfonic or a carboxylic acid, e.g., tosyl, benzyloxycarbonyl, p-nitrobenzyloxycarbonyl or tetrachloroisopropyloxyphthaloyl. In all instances, the protective groups, of course, should be chosen in such a way that they can easily be removed by one or more simple treatments which are mild enough as not to affect the aminoacid chain bonds. If desired, the protective groups may be removed stepwise; for instance, where R and R' are the usual benzyl or substituted benzyl ether, these groups may be removed by hydrogenation and subsequently, the protective group on the arginyl fragment can be removed by a suitable reaction step that does not affect the aminoacid links of Gn-RH. Of course, such a reaction sequence may be reversed, if desired.

In order to show the preparation of the new decapeptide, reference is made to the following examples which are to be understood as illustrations only and are not to be construed to limit the invention in any respect.

Example 1

To a solution of 836 mg. of His-Trp-(O-Bzl)Ser(O-Bzl)Tyr-Gly-Leu-($N^\omega$-$NO_2$)Arg-Pro - Gly - $NH_2$ (0.645 mmoles) in 2 ml. of dimethylformamide was added 755 mg. of pyroglutamic acid pentachlorophenyl ester (2 moles) and the mixture was allowed to stand at room temperature for 16 hours. The solvent was then evaporated and the product was dissolved in about 4 ml. of 30% methanol in chloroform. This solution was placed on a chromatographic column (30 cm. high, 2.4 cm. diameter) containing 45 g. of silica gel. The column was eluted initially with 100 ml. of 5% methanol in chloroform, subsequently with 15% methanol in chloroform and finally, the desired product was eluted with 300 ml. of methanol/chloroform 1:2. Small fractions of this eluate were tested for purity by thin-layer chromatography and the fractions containing the desired material were pooled. After evaporation of the solvent from this pool, the residue was dissolved in hot methanol and cooled to room temperature to yield 412 mg. of pGlu-His-Trp-(O-Bzl)Ser-(O-Bzl)Tyr-Gly-Leu-($N^\omega$-$NO_2$)Arg-Pro-Gly-$NH_2$ of high purity, showing $R_f$ in 33% $CH_3OH$/$CHCl_3$ of 0.3; $[\alpha]_D^{24}$= $-25.2°$ (c. 1; AcOH) and a m.p. of 166–69° C. Both the nitrogen elemental analysis and the NMR spectrum confirmed the expected structure.

By replacing the used His-Trp-(O-Bzl)Ser-(O-Bzl)-Tyr-Gly-Leu-($N^\omega$-$NO_2$)Arg-Pro-Gly-$NH_2$ with other nonapeptides of the same sequence but carrying other protective groups, the following decapeptides can be prepared in the same manner:

pGlu-His-Trp-(O-Ser-(O-Bzl)Tyr-Gly-Leu-($N^\omega$-$NO_2$)Arg-Pro-Gly-$NH_2$ pGlu-His-Trp-(O-Z)Ser-(O-Bzl)Tyr-Gly-Leu-($N^\omega$-$NO_2$)Arg-Pro-Gly-$NH_2$ pGlu-His-Trp-(O-THP)Ser-(O-Bzl)Tyr-Gly-Leu-($N^\omega$-$NO_2$)Arg-Pro-Gly-$NH_2$ pGlu-His-Trp-(O-MeOBzl)Ser-(O-Bzl)Tyr-Gly-Leu-($N^\omega$-$NO_2$)Arg-Pro-Gly-$NH_2$ p-Glu-His-Trp-(O-Ac)Ser-(O-Bzl)Tyr-Gly-Leu-($N^\omega$-$NO_2$)Arg-Pro-Gly-$NH_2$ pGlu-His-Trp-(O-Bzl)Ser-(O-Z)Tyr-Gly-Leu-($N^\omega$-$NO_2$)Arg-Pro-Gly-$NH_2$ pGlu-His-Trp-(O-Bzl)Ser-(O-TRI)Tyr-Gly-Leu-($N^\omega$-$NO_2$)Arg-Pro-Gly-$NH_2$ pGlu-His-Trp-(O-Bzl)Ser-(O-Ac)Tyr-Gly-Leu-($N^\omega$-$NO_2$)Arg-Pro-Gly-$NH_2$ pGlu-His-Trp-(O-Bzl)Ser-(O-Tos)Tyr-Gly-Leu-($N^\omega$-$NO_2$)Arg-Pro-Gly-$NH_2$ pGlu-His-Trp-(O-Bzl)Ser-(O-THP)Tyr-Gly-Leu-($N^\omega$-$NO_2$)Arg-Pro-Gly-$NH_2$ pGlu-His-Trp-(O-Bzl)Ser-(O-TBu)Tyr-Gly-Leu-($N^\omega$-$NO_2$)Arg-Pro-Gly-$NH_2$ pGlu-His-Trp-(O-Bzl)Ser-(O-MeOBzl)Tyr-Gly-Leu-($N^\omega$-$NO_2$)Arg-Pro-Gly-$NH_2$ wherein Z stands for benzyloxycarbonyl, THP means tetrahydropyranyl, TBu is tert.-butyl, MeOBzl is p-methoxybenzyl, Tos is tosyl (=p-toluenesulfonyl), Ac is acetyl and TRI is triphenylmethyl. Other blocking groups that may be used include the trifluoroacetyl and other substituted alkylcarbonyl groups for Tyr and Ser and various groups for the imidazole-N is His that can be cleaved without affecting the peptide chain. In all instances, $N^\omega$ of Arg may carry the tosyl group or other benzyloxycarbonyl or tetrachloroisopropyloxyphthaloyl in place of the above used nitro group. In each case, the reaction described above proceeds in the same fashion and all the listed compounds may be converted to Gn-RH by the method described in Example 2 or a similarly simple method, making these compounds equally useful precursors therefor. Of course, the synthesis for the protected nonapeptide described may have to be slightly modified when making the nonapeptide carrying different protective groups on the arginyl-N, the seryl or the tyrosyl moieties, without however, significantly changing the described synthesis. The individual aminoacids carrying the above-shown protective groups are known in the art and all of them are often used in peptide syntheses; they are described in the English Edition of the textbook by Schroder et al., entitled The Peptides I (Academic Press 1965) on pages 167–174 for arginine, pages 210–212 for serine and pages 222–225 for tyrosine or in Peptides, Proceedings of the 8th European Peptide Symposium Edited by Beyerman (North Holland Publishing Co., Amsterdam 1967), page 50 ff.

By replacing the above used pyroglutamic acid ester by an equivalent amount of the ester carrying a protective group, e.g., N-benzyloxycarbonyl-, N-*tert.*-butyloxycarbonyl1, N-*o*-nitrophenylsulfenyl-, N-2-(diphenyl)isopropyloxycarbonyl or other known blocking groups, the same condensation takes place but the resulting decapeptide contains an additional protective group which may be removed separately by known methods or which will be removed by the procedure described in the following example.

Example 2

The protected decapeptide from Example 1 (500 mg.) was placed in a Kel-F® (chlorotrifluoroethylene polymer marketed by the Kellogg Co.) reaction vessel of the type described by Sakakibara in Bull. Chem. Soc. Japan *40*, 2164 (1967) and 1.0 ml. of anisole was added. To this mixture, 10 ml. of hydrogen fluoride dried over cobalt trifluoride and collected as a liquid from a HF-tank at —20° C. was added and the mixture was allowed to stand at room temperature for 1 hour. Excess hydrogen fluoride was flushed out of the reaction vessel with nitrogen gas and the reaction product was extracted five times with ether to remove the anisole. The ether solution was dried over phosphorous pentoxide and potassium hydroxide for 16 hours. The product was then dissolved in water and acetic acid and extracted once with ether and filtered. The aqueous filtrate was evaporated and the product dissolved in glacial acetic acid and lyophilized.

The crude synthetic material was dissolved in 0.1 N acetic acid and the solution was subjected to gel filtration through Sephadex G–15. The eluted fractions corresponding to the main component were combined and lyophilized. A sample of the purified synthetic material showed identical patterns with the natural hormone when subjected to two dimensional thin layer electrophoresis-chromatography on cellulose thin layer plates with the thin layer electrophoresis system pyridine-acetic acid pH 6.5 and the thin layer chromatography solvent *n*-butanol/acetic acid/water 4:1:1. A sample of this synthetic preparation showed biological activity corresponding to that of the best samples reported to date of the natural hormone, as ascertained by the ovarian ascorbic acid depletion assay (Parlow; Human Pituitary Gonadotropins, p. 300, 1961, Springfield, Illinois) for LH and by the highly specific bioassay (Steelman and Pohley, Endocrinology, Vol. 53, page 604 of 1953) for FSH. The work-up described above may be altered in anyone of the various known fashions. For instance, other types of gel filtration systems, counter-current distribution method, partition chromatography, ion-exchange chromatography electrophoresis and adsorption chromatography may be used.

I claim:
1. The decapeptide pyro-Glu-His-($N^{Im}$-X)-Trp-(O-R)-Ser-(O-R')Tyr-Gly-Leu($N^{\alpha}$-R'')Arg-Pro-Gly-$NH_2$ wherein X, R, R' and R'' are protective groups which can be removed by one or more chemical treatments which do not affect the decapeptide chain pyro-Glu-His-Trp-Ser-Tyr-Gly-Leu-Arg-Pro-Gly-$NH_2$.
2. The peptide of Claim 1 wherein R and R' are benzyl, R'' is the nitro group and X is hydrogen.
3. The process of preparing the decapeptide pyro-Glu-His - ($N^{Im}$ - X)Trp-(O-R)Ser-(O-R')Tyr-Gly-Leu-($N^{\alpha}$-R'')Arg-Pro-Gly-$NH_2$ consisting essentially in reacting the protected nonapeptide His-($N^{Im}$-X)Trp-(O-R)Ser(O-R')Tyr-Gly-Leu-($N^{\alpha}$-R'')Arg-Pro-Gly-$NH_2$ wherein X, R, R' and R'' are protective groups which can be removed by one or more chemical treatments which do not affect the aminoacid chain with an active ester of pyroglutamic acid in the presence of an inert, polar solvent at a temperature between 0 and 30° C. for a period of at least one hour and isolating the resulting decapeptide from the reaction mixture.
4. The process of Claim 3 wherein R and R' are benzyl, R'' is the nitro group and X is hydrogen.
5. The process of Claim 3 wherein said active ester of pyroglutamic acid is the pentachlorophenyl ester.
6. The process of Claim 3 wherein said active ester of pyroglutamic acid is used in 50–200% excess over the equimolar amount of said nonapeptide.

References Cited

Monohan et al., C.R. Acad. Sc. Paris, *273*, Ser. D. 508 (1971).
Merrifield, Adv. in Enzymology, *32*, 243–251 (1969).
Baba et al., Biochem. Biophys. Res. Comm., *44*, 459 (July 16, 1971).
Matsuo et al., Biochem. Biophys. Res. Comm., *43*, 1334 (June 18, 1971).

LEWIS GOTTS, Primary Examiner

R. J. SUYAT, Assistant Examiner